UNITED STATES PATENT OFFICE.

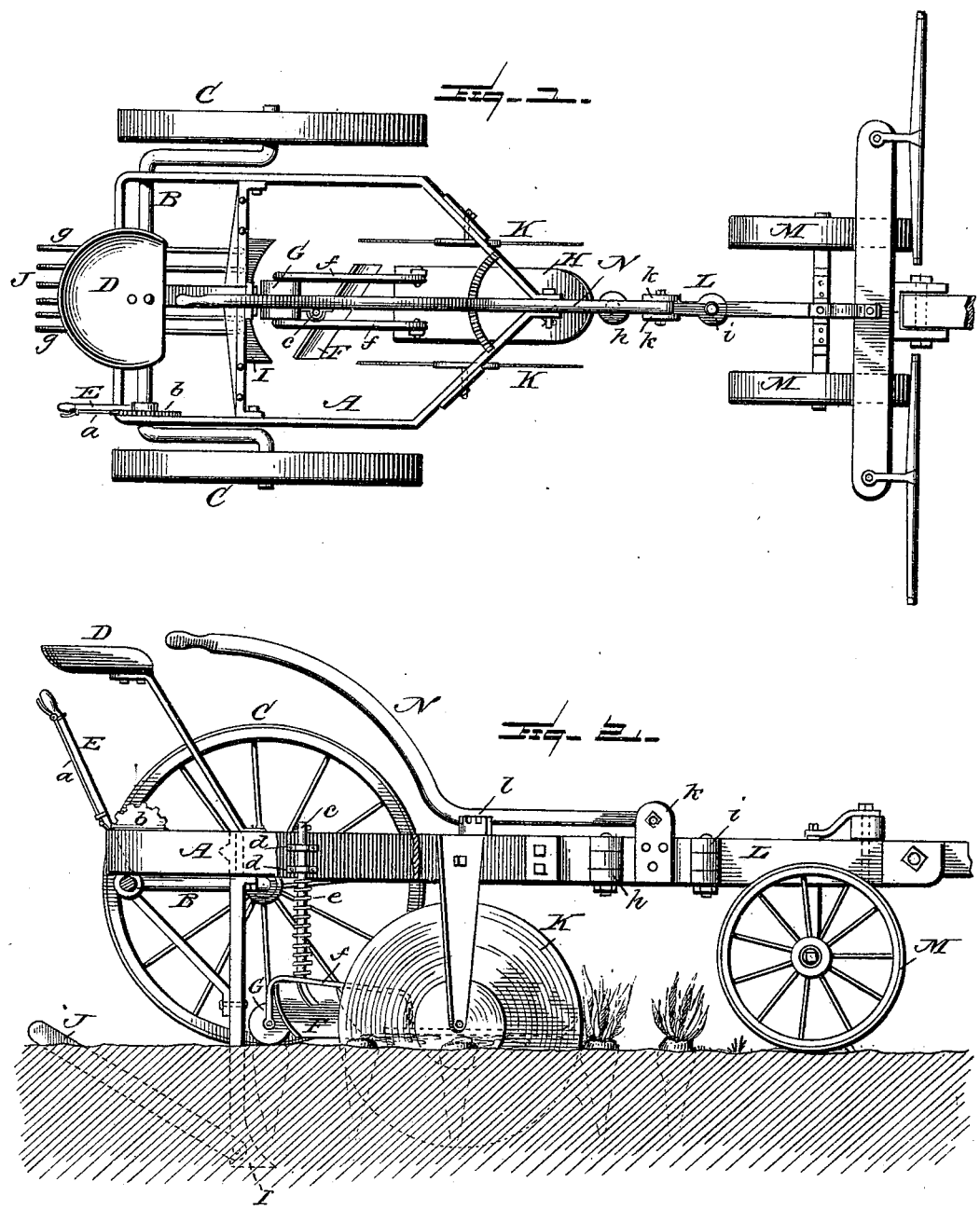

JAMES I. JACKSON AND AARON E. JACKSON, OF GRAND JUNCTION, COLORADO.

MACHINE FOR HARVESTING BEETS.

SPECIFICATION forming part of Letters Patent No. 645,957, dated March 27, 1900.

Application filed January 8, 1900. Serial No. 696. (No model.)

*To all whom it may concern:*

Be it known that we, JAMES I. JACKSON and AARON E. JACKSON, citizens of the United States, residing at Grand Junction, in the county of Mesa and State of Colorado, have invented certain new and useful Improvements in Machines for Harvesting Beets or Tubers; and we do hereby declare that the following is a full, clear, and exact description of the invention, reference being had to the annexed drawings, making a part of this specification, and to the letters of reference marked thereon.

The present invention has relation to that class of agricultural machines especially designed for harvesting beets or tubers by first cutting off the projecting top and afterward removing the body from the ground; and the invention has for its object to improve such class of machine in the several details of construction, whereby the harvesting of the beet or tuber is greatly facilitated.

The invention consists in a machine constructed substantially as shown in the drawings and hereinafter described and claimed.

Figure 1 of the drawings is a top plan view of a machine constructed in accordance with our invention; Fig. 2, a side elevation thereof, partly in section, showing a portion of the machine below the surface of the ground in the act of topping and removing the beet or tuber.

In the accompanying drawings, A represents a suitable frame, which is provided with the crank-axle B, upon the ends of which are mounted the wheels C, said frame having the usual seat D for the driver.

The axle B has connected to it a suitable hand-lever E, by which the crank ends of the axle may be raised or lowered and held in their adjusted position by means of a suitable hand-pawl $a$, adapted to engage with a notched segment $b$. Any suitable and well-known means may be employed by which the hand-lever may be held in position after the crank ends of the axle have been adjusted. This adjustment of the ends of the crank-axle will raise or lower the frame A to bring the parts hereinafter described out of or in operative position.

To the frame A is suitably connected a spring-actuated concavo-convex blade F, which is designed to remove the projecting portion of the beet or tuber by what is usually termed "topping." This blade F is attached to the lower end of a rod $c$, the upper end of the rod being loosely held in suitable brackets $d$ upon the frame, a coiled spring $e$ encircling the rod to render the blade spring-actuated. The blade F may be suitably connected to the arm $f$, or any other well-known means may be provided to prevent the rod $c$, with its blade, from turning on its axis, so as to prevent the blade yielding to the pressure of the top of the beet and turning aside. In the rear of the blade F is the regulating-roller G, which is suitably connected to the arms $f$, the forward or opposite ends of the arms having connected thereto the guide-shoe H, by which the depth of the cutting-blade F is regulated by first changing the height of the shoe. Any suitable means may be employed for rendering the shoe H vertically adjustable, such as bolts extending through elongated slots.

The plow I, immediately in the rear of the topping-blade F, has its standard connected to the frame A in any suitable and well-known manner, and to the lower end of this plow is connected a grate J, through which the earth is sifted, the beets or tubers being raised by the plow I and delivered upon the surface of the ground. This grate, through which the earth is sifted, is disposed at an acute angle to the plow or on an incline and comprises a plurality of parallel bars $g$, as shown in Fig. 1 of the drawings. Forward of the topping-blade F are the two rolling colters K, which part the ground in advance of the plow I, said colters being connected to the frame A in any desirable manner.

Connected to the frame A in any preferred manner is a double-jointed beam L, provided with the forward wheels M and the usual means for connecting thereto a draft-team. The beam L is double jointed, as shown at $h$ $i$, and the beam between said joints is provided with a bracket $k$, to which is pivoted a hand-lever N for controlling the beam.

In the operation of the machine the colters K, entering the ground, will first part the earth, while the shoe H, sliding on the surface of the ground and over the projecting ends of the beets or tubers, will crush down the same, after which the concavo-convex cutting-blade F, immediately following the shoe, will cut off and throw the projecting end of the beet or tuber to one side, the spring action of the blade rendering it automatically adjustable in being pressed to the ground with the required tension to render the blade perfect in its action. The beet or tuber being now relieved of its projecting end by the cutting-blade F and the earth loosened around it by the colters K, the plow I, which may be of any suitable form and construction, is now brought into action, which digs up the beet or tuber, causing it to be deposited upon the inclined grate J and carried to the surface of the ground. The hand-lever N when moved to either side will act on the double-jointed guide-beam L to throw the frame A out of line with the beam, thereby causing the plow or digger to run to one side or the other, as the case may be. The hand-lever N is held by engagement with a suitable quadrant $l$, as shown in Fig. 2 of the drawings, or by any other well-known means that will securely hold the lever in position after being moved to one side, for the purpose hereinbefore described. The adjustability of the shoe H with relation to the cutting-blade F is deemed of material importance in that it regulates the depth of the cutting-blade, the roller G guiding the blade in its action in topping the beet or tuber and facilitating its operation. The coiled spring $e$ upon the rod $c$ enables the blade F to yield in a vertical direction when coming in contact with any obstruction on the ground.

The frame A may be raised or lowered by means of the crank-axle B and hand-lever E, which controls the digger or plow I, lowering it or raising it out of the ground, thereby rendering the frame vertically adjustable, which will determine the depth of the plow in the ground.

The construction and form of the rolling colter K, the shoe H, or topping-blade F may be variously modified or changed without affecting the principle of the invention, and any such change in the several details of the frame and its connecting parts as would come within ordinary mechanical judgment may be resorted to without departing from the essential features of the invention. The machine is equally applicable for digging and raising roots or any vegetable or tuber grown in the ground, such as turnips and the like.

Having now fully described our invention, what we claim as new, and desire to secure by Letters Patent, is—

1. A machine for harvesting beets, consisting of a frame with means for rendering it vertically adjustable, colters, a topping-blade, and a plow, and an inclined grate connected thereto, substantially as and for the purpose set forth.

2. A machine for harvesting beets, consisting of a frame, colters carried thereby, a spring-actuated topping-blade, a shoe with guide-roller for the blade, and a plow, substantially as and for the purpose described.

3. A machine for harvesting beets, consisting of a frame, a double-jointed beam connected thereto and means for controlling said beam, colters, a topping-blade, and a plow connected to the frame, substantially as and for the purpose specified.

4. A machine for harvesting beets, consisting of a frame, colters connected thereto, a plow, a topping-blade, and a vertically-adjustable shoe, substantially as and for the purpose set forth.

5. A machine for harvesting beets, consisting of a frame, colters connected thereto, a vertically-adjustable shoe, a guide-roller connected thereto, a topper-blade, and a plow, and a grate connected thereto and disposed upon an incline, substantially as and for the purpose described.

6. A machine for harvesting beets, consisting of a frame adapted for vertical adjustment, colters, a topping-blade, a shoe, and plow connected to the frame, and a double-jointed beam connecting with the frame, and means for operating the same, substantially as and for the purpose specified.

7. A machine for harvesting beets, consisting of a frame, colters connected thereto, a vertically-adjustable shoe, a guide-roller connected to the rear end of the shoe by arms, a spring-actuated topping-blade, and a plow, substantially as and for the purpose set forth.

8. A machine for harvesting beets, consisting of a frame provided with a crank-axle, wheels mounted upon the ends of the axle, a hand-lever connecting with the axle by which means the frame may be adjusted vertically, a double-jointed beam connecting with the frame and means for operating it, and colters, a shoe, a topping-blade, and a plow connected to the frame, substantially as and for the purpose described.

9. A machine for harvesting beets, consisting of a frame, colters connected thereto, an adjustable shoe, a spring-actuated topping-blade, a guide-roller therefor connecting with the shoe, and a plow provided with an inclined grate comprising a series of parallel bars or rods, substantially as and for the purpose specified.

In testimony that we claim the above we have hereunto subscribed our names in the presence of two witnesses.

JAMES I. JACKSON.
AARON E. JACKSON.

Witnesses:
S. P. EGENESS,
J. F. SPENCER.